United States Patent
Orban et al.

(10) Patent No.: US 10,302,196 B2
(45) Date of Patent: May 28, 2019

(54) SELF CLEANING PISTONS

(71) Applicant: Schlumberger Technology Corporation, Sugar land, TX (US)

(72) Inventors: Jacques Orban, Orem, UT (US); Guy James Rushton, Froceste (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 812 days.

(21) Appl. No.: 14/710,501

(22) Filed: May 12, 2015

(65) Prior Publication Data
US 2016/0017998 A1      Jan. 21, 2016

Related U.S. Application Data

(60) Provisional application No. 62/025,464, filed on Jul. 16, 2014.

(51) Int. Cl.
| | | |
|---|---|---|
| *F16J 15/16* | (2006.01) | |
| *F16J 1/09* | (2006.01) | |
| *E21B 37/08* | (2006.01) | |
| *E21B 37/10* | (2006.01) | |

(52) U.S. Cl.
CPC ............... *F16J 1/09* (2013.01); *E21B 37/08* (2013.01); *E21B 37/10* (2013.01); *F16J 15/168* (2013.01)

(58) Field of Classification Search
CPC ... F16J 15/168; F16J 15/00; F16J 1/09; E21B 37/10; E21B 37/08; E21B 37/045; E21B 37/04; E21B 34/04; E21B 33/1285; E21B 34/14; E21B 7/00
See application file for complete search history.

(56) References Cited

U.S. PATENT DOCUMENTS

| | | | | |
|---|---|---|---|---|
| 4,007,784 | A * | 2/1977 | Watson | ............... E21B 37/04 166/170 |
| 7,121,335 | B2 * | 10/2006 | Townsend | ........... E21B 43/121 166/105 |
| 7,475,731 | B2 * | 1/2009 | Victor | ............... E21B 43/121 166/105 |

(Continued)

FOREIGN PATENT DOCUMENTS

| | | |
|---|---|---|
| CN | 2303945 Y | 1/1999 |
| CN | 2417302 Y | 1/2001 |

(Continued)

OTHER PUBLICATIONS

First Office Action issued in Chinese patent application 201510407911.0 dated Dec. 2, 2016. 19 pages.

*Primary Examiner* — Michael Leslie
*Assistant Examiner* — Abiy Teka

(57) ABSTRACT

A technique facilitates tool operation with mobile pistons submitted to differential pressure. The technique utilizes a mobile piston slidably mounted in a corresponding piston passage. The piston passage is defined by a passage wall surface, and the piston may be moved linearly along the piston passage under the influence of an actuating fluid or to pump a fluid. The exterior surface of the piston and/or the passage wall surface have a groove or a plurality of grooves located and arranged to collect particulates from the fluid. Removal of the particulates facilitates actuator piston function by reducing, for example, third body abrasion and jamming of the piston.

20 Claims, 7 Drawing Sheets

(56) References Cited

U.S. PATENT DOCUMENTS

| | | | |
|---|---|---|---|
| 2006/0185853 A1* | 8/2006 | Bender | E21B 37/045 |
| | | | 166/372 |
| 2013/0209225 A1 | 8/2013 | Eslinger | |
| 2015/0226012 A1* | 8/2015 | Zhou | E21B 7/00 |
| | | | 175/57 |

FOREIGN PATENT DOCUMENTS

| | | |
|---|---|---|
| CN | 2491625 Y | 5/2002 |
| CN | 2639563 Y | 9/2004 |
| CN | 202690429 U | 1/2013 |
| CN | 203051096 U | 7/2013 |
| CN | 103899279 | 8/2013 |
| CN | 203297348 U | 11/2013 |
| GB | 1134999 | 9/2004 |

\* cited by examiner

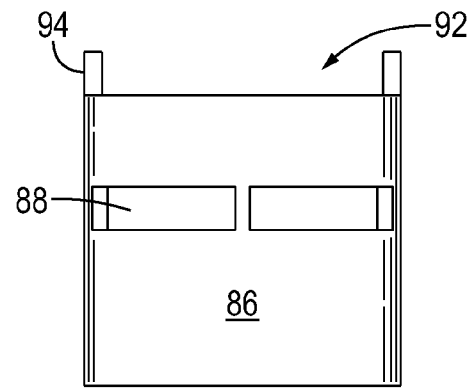
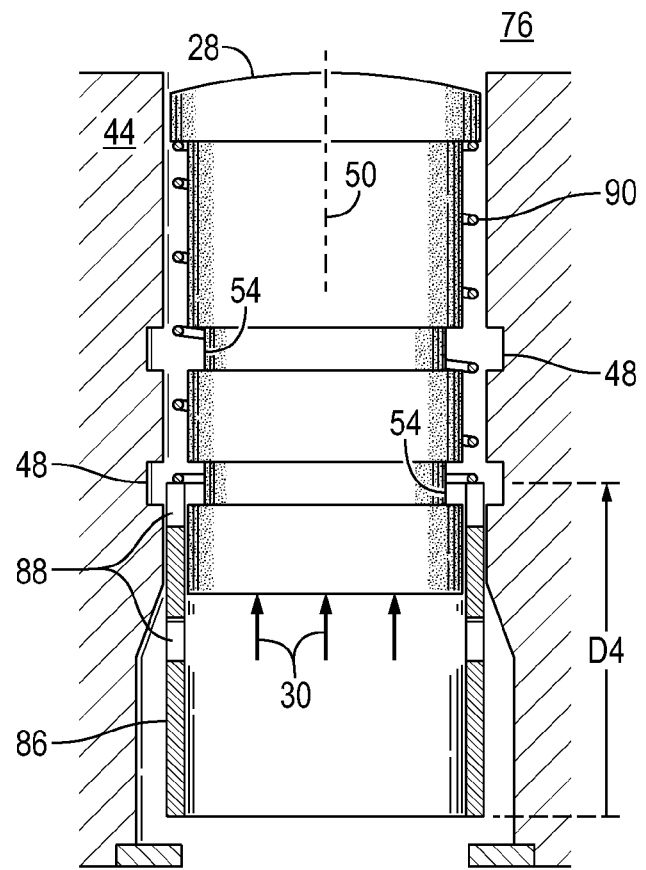

SELF CLEANING PISTONS

CROSS-REFERENCE TO RELATED APPLICATIONS

The present document is based on and claims priority to U.S. Provisional Application Ser. No. 62/025,464, filed Jul. 16, 2014, which is incorporated herein by reference in its entirety.

BACKGROUND

In many hydrocarbon well applications and other applications, pistons are employed to actuate a variety of tools and systems. In some applications, the pistons are actuated by a working or actuating fluid. In other applications, the pistons are used to move fluid: this is the case in a piston pump. During their usage, these pistons are submitted to a difference of fluid pressure between their two extremity surfaces. To contain this difference of pressure, many pistons employ seals, e.g. elastomeric dynamic seals or metal piston rings, to exclude particulates in the actuating fluid from the piston/cylinder bore interface. In some applications, e.g. wellbore drilling applications using drilling mud (either as actuating fluid or as the fluid being moved), the fluid may contain a substantial amount of hard particulates. Even with seals, the particulates can enter the clearance between the piston and the surrounding wall which often is a cylindrical wall. As a result, the particulates can damage the piston components via third body abrasion and/or completely jam the motion of the piston as the particulates embed in the piston and/or surrounding cylinder surfaces.

SUMMARY

In general, a system and methodology are provided for facilitating tool operation, e.g. actuation, with mobile pistons submitted to differential pressure. The technique utilizes a mobile, e.g. actuating, piston slidably mounted in a corresponding piston passage. The piston passage is defined by a passage wall surface, and the piston may be moved linearly along the piston passage with an actuating fluid. The exterior surface of the piston and/or the passage wall surface have a groove or a plurality of grooves located and arranged to collect particulates from the actuating fluid. In some applications, the grooves are formed in a hardened material. Removal of the particulates facilitates actuator piston function by reducing, for example, third body abrasion and jamming of the piston. With a desired layout of the grooves, the accumulated particles may pass from one groove to the next groove while the piston performs its reciprocating movement. This progressive movement of the particles allows clean-up of the grooves so that lengthy operation of the piston can be achieved with fluid containing particles.

However, many modifications are possible without materially departing from the teachings of this disclosure. Accordingly, such modifications are intended to be included within the scope of this disclosure as defined in the claims.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and:

FIG. 12 is a schematic view of the mobile sleeve illustrated in FIG. 11, according to an embodiment of the disclosure;

FIG. 13 is a schematic cross-sectional view illustrating movement of the piston and the piston sleeve, according to an embodiment of the disclosure;

DETAILED DESCRIPTION

Figure 1:
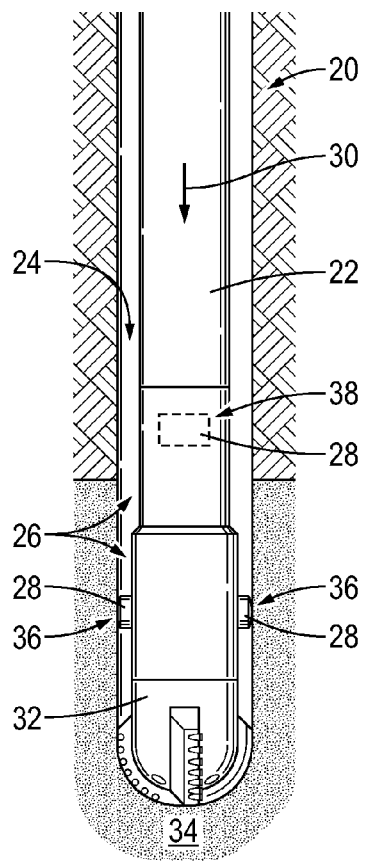
FIG. 1 is a schematic illustration of an example of a system comprising a tool having at least one piston type actuator, according to an embodiment of the disclosure.

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

The present disclosure generally relates to a system and methodology for facilitating tool actuation by improving the reliability of actuator pistons. The technique effectively removes particles from the interface, e.g. clearance, between an actuator piston and the surrounding wall of the bore. The bore can be cylindrical or another suitable shape, such as a section of a toroid. This system can be associated with a piston and bore involving tight clearance which serves to limit the fluid leakage if no conventional seals are installed along the clearance. However, the groove system can also be used with a piston involving a conventional seal or seals. The particulates are removed to grooves to reduce detrimental effects, such as third body abrasion and jamming of the piston motion.

With proper lay-out of the grooves, the piston can facilitate particular removal well-being moved along a main piston axis. In some applications, a difference of fluid pressure may be applied between both extremities of the piston while a leak rate is maintained at a low value. The groove shape can be optimized to enhance the self-cleaning of the groove in a variety of applications. Also, additional features may be added in the groove to improve the cleaning of the groove. In the case of a piston which may perform short strokes, a mobile sleeve with similar grooves may be added between the piston and the wall. This mobile sleeve is constructed to perform longer stroke for ensuring the progressive movement of particles to enhance clean-up.

In some applications, the grooves are formed in a hardened material to further reduce the potentially deleterious effects of particulates in the piston actuating fluid. This approach may be used in a variety of applications, including downhole well applications in which the actuating fluid may contain particulates or is susceptible to particulate contamination. For example, the system and methodology may be used for downhole piston actuators operated by actuating fluid in the form of drilling mud. The system also can be used in pumping applications involving moving pistons and plungers Such a pumping design can be applied on the surface of an actuating rod passing through a wall wetted by fluid where fluid is contained from one side of the wall versus the other side of the wall.

In applications involving either actuating or pumping pistons, differential pressure may be applied to the piston (between the two extremities of the piston). This differential pressure has a tendency to push the fluid into the tight clearance between the piston and the bore which increases the risk of entraining particles in this narrow clearance. In the case of an actuating application, the force delivered by the piston is generated by the differential pressure of the actuating fluid; and the force, the differential pressure, and the displacement of the piston are in the same direction. In the case of a pump application, the force applied on the piston is in the opposite direction of the differential pressure applied onto the piston. When the force is applied in the opposite direction, the configuration of the system may change, e.g. an orientation of some features of the grooves may change.

In some embodiments, the technique employs at least one actuating piston slidably mounted in a corresponding piston passage. The piston passage is defined by a passage wall surface, and the piston may be moved linearly along the piston passage with an actuating fluid, e.g. drilling mud or another suitable actuating fluid. The exterior surface of the piston and/or the passage wall surface have a groove or a plurality of grooves located and arranged to act as chambers for collecting particulates from the fluid that is present. Removal of the particulates facilitates the piston (or rod and shaft) function by reducing, for example, third body abrasion and jamming of the piston (or rod and shaft).

In some applications, the grooves may be formed in a hardened material, e.g. polycrystalline diamond, silicon-bonded diamond, tungsten carbide, ceramic, stellite or other hard materials, to further limit abrasion and other potentially deleterious effects caused by the particulates. Depending on the application, the outer surface of the piston and the surrounding piston passage surface may be formed of hard material with closely spaced tolerances to limit leakage flow around the piston. In this manner, the piston actuator may be operated without using dynamic seals in a variety of applications Referring generally to FIG. 1, an example of a system 20, e.g. a borehole drilling system, is illustrated as having a tool string 22 deployed in a wellbore 24. The tool string 22 comprises a plurality of tools 26 which are actuatable via pistons 28. In this example, the pistons 28 and their corresponding tools 26 are actuatable via a suitable actuating fluid 30. The actuating fluid 30 may comprise a downhole well fluid, such as a drilling mud, other actuating fluid pumped downhole, or fluid occurring naturally downhole. For example, the actuating fluid 30 day comprise fluids occurring naturally downhole under sufficient pressure to serve as actuating fluid 30.

By way of example, tool string 22 may comprise a drill string having a drill bit 32 which is rotated to drill the wellbore 24 in a desired formation 34. In this example, the pistons 28 may be part of piston-type actuators 36 used for steering the drill bit 32 along a desired trajectory. Other pistons 28 may be in the form of internal pistons 38, e.g. piston sleeves, for actuating a variety of sliding sleeves, valves, and/or other tool string components. However, many types of pistons 28 and actuating fluids 30 may be used in a variety of borehole drilling applications and other applications in which the drilling fluid 30 contains particulates or is susceptible to contamination by particulates.

Figure 2:
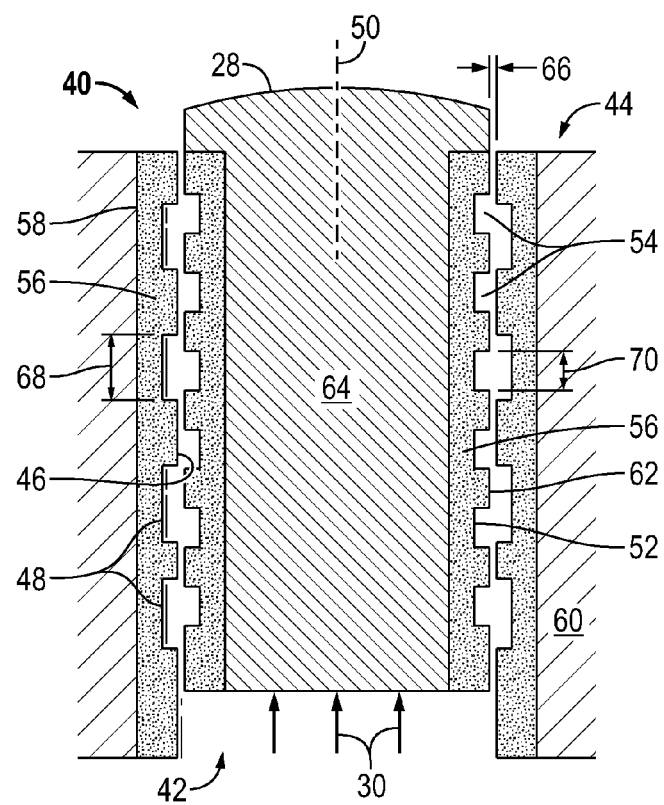
FIG. 2 is a cross-sectional view of an example of a piston type actuator, according to an embodiment of the disclosure.

Referring generally to FIG. 2, an example of an actuator system 40 comprising piston 28 is illustrated. In this example, piston 28 is slidably received in a piston passage 42 of a surrounding structure which may be referred to as a stator 44. The piston passage 42 is defined by a passage wall surface 46. In many applications, the piston 28 is generally circular in cross-section and the piston passage 42 is generally cylindrical in shape. As illustrated, the piston passage wall surface 46 has a plurality of passage cross grooves 48 which may be arranged circumferentially around the piston passage 42. In some applications, the passage cross grooves 48 comprise a plurality of separate grooves although the plurality of passage cross grooves 48 can be connected together in, for example, a helical pattern or other suitable pattern.

The piston 28 is received in piston passage 42 for linear movement along a linear axis 50. The piston 28 also comprises an exterior surface 52 having a plurality of piston cross grooves 54 which may be arranged circumferentially around the piston 28. In some applications, the piston cross grooves 54 comprise a plurality of separate grooves although the plurality of piston cross grooves 54 can be connected together in, for example, a helical pattern or other suitable pattern. The piston cross grooves 54 and the passage cross grooves 48 slide past each other during movement of the piston along the linear axis 50 and provide collection regions for collecting particulates that may be in actuating fluid 30. The movement of piston 28 along an axis 50 is caused by the pressure of the actuating fluid 30 acting against an end of the piston 28 as represented by actuating fluid arrows 30 in FIG. 2.

In the embodiment illustrated, the passage cross grooves 48 are formed in a hardened material 56. By way of example, the hardened material 56 may comprise polycrystalline diamond, silicon bonded diamond, tungsten carbide, ceramic, stellite or another suitable hard material which protects against abrasion from particulates in actuating fluid 30. In the example illustrated, the hardened material 56 is constructed as a sleeve 58 mounted within a body 60 of stator 44. However, the hardened material 56 also may be applied as a coating or insert, or the entire stator 44 may be formed of hard material 56.

In this example, the piston cross grooves 54 also may be formed in a hardened material 56. By way of example, the hardened material 56 may again comprise diamond carbide, tungsten carbide, or another suitable hard material which protects against abrasion from particulates in actuating fluid 30. The hardened material 56 may be used on piston 28 and/or stator 44 depending on the application. Additionally, the hardened material 56 may be the same type of material on both piston 28 and stator 44 or the hardened material 56 may be different between these two components. In the example illustrated, the hardened material 56 of piston 28 is constructed as a sleeve 62 mounted along an interior body 64 of piston 28. However, the hardened material 56 also may be applied as a coating or insert along piston body 64, or the entire piston 28 may be formed of hard material 56.

Depending on the application, both the passage cross grooves 48 and the piston cross grooves 54 may be formed as timed grooves. The timed grooves 48, 54 enable each edge-edge pair of corresponding grooves 48, 54 to come into contact sequentially and also for particles in actuating fluid 30 to be driven progressively into successive chambers/grooves in the direction of the pressure gradient and thus out of the interface between piston 28 and the stator 44. As illustrated, the interface has a running clearance 66 and grooves 48, 54 provide chambers for receiving the particulates as they are driven out of this interface, thus maintaining the running clearance 66. The effectiveness of the timed grooves 48, 54 may be further enhanced by selecting an appropriate groove pitch 68 for passage surface 46 and an appropriate corresponding groove pitch 70 for the exterior surface 52 of piston 28.

The flow in the working clearance can be estimated. For this description, we refer initially to the sequence illustrated in FIG. 3. In this example, fluid is forced into running clearance 66 and becomes a leak. The leak rate depends on the difference of pressure applied onto the piston and also the fluid properties (e.g. rheology and density). Geometrical elements also may play a role in the determination of the leak rate. As a simplified hydraulic model of the leak, the fluid can be considered as being forced into the narrow flow slit having the following characteristics:

its thickness is the working clearance 66;
its perpendicular extent is the circumference of the piston 28,
its axial extend is the sum of the tight overlaps between the piston 28 and the bore in which the piston 28 moves. This axial extent is represented as 71a and 71b in FIG. 3.

An example of a set of parameters for this geometry and flow is as follows:

The working clearance is small and may be in the range of 10 to 100 microns, e.g. 20 microns is considered for this example. The flow is mostly laminar.
The circumference of the piston may be in the range of 25 to 200 mm In the following example, the circumference is 120 mm (piston diameter is 38.2 mm)
The sum of the tight overlap may be in the range of 5 to 50 mm: In the following example, this length is is 25 mm (71a+71b).

The fluid viscosity may be in the range of 1 to 100 cenitPoise. In the following example, the viscosity is 10 centiPoise (0.01 Pa S).
The flow in a narrow slit is given by:

$$Q = \frac{1}{12}\frac{\Delta P}{\mu}\frac{Ht^3}{L} \quad \text{formula (a)}$$

With

| | |
|---|---|
| Q = flow rate (m³/s) | |
| ΔP = differential pressure across the piston (Pa) | 5.0 10⁶ Pa (50 Bars) |
| μ = fluid viscosity (Pa S) | 0.01 Pa s (10 cP) |
| H = circumference of the piston (m) | 0.12 m |
| T = working gap (m) | 20 10⁻⁶ m (20 microns) |
| L = length of the working gap (71a + 72b) | 0.025 m |

Using the values of this particular example, Q=1.6 $10^{-18}$ m3/s (7 $10^{-12}$ GPM)

For this low flow rate, the fluid velocity in the working clearance is in the range of 0.66 $10^{-9}$ m/s.

The Reynolds number is :

$$Re = \rho VT/\mu$$
$$= 1000 \times 0.66 \ 10^{-9} \times 20 \ 10^{-6}/0.01$$
$$= 1.33 \ 10^{-13}$$

This confirms that the flow in the working gap is laminar, so that the formula (a) is adequate.

Figure 3:
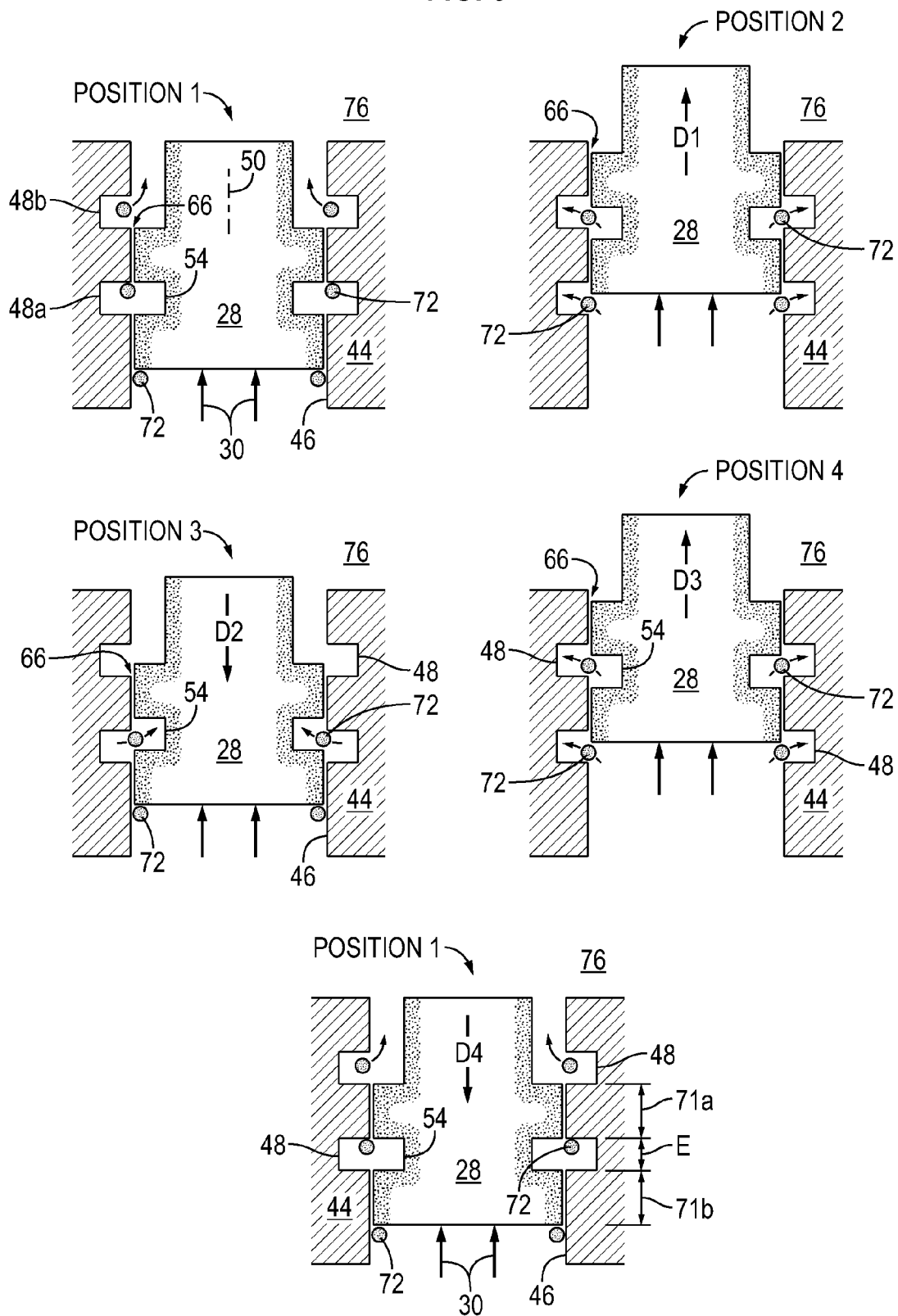
FIG. 3 illustrates movement of particles and successive positions of particles during piston movements, according to an embodiment of the disclosure.

With such narrow working clearance 66, some larger particles of the fluid cannot pass in the clearance. They are illustrated as particles 72 accumulated at an entrance to clearance 66 in Position 1 as shown in FIG. 3. When considering drilling mud, lost circulation material (LCM) particles and even some barite can form this accumulation. These large particles may represent up to 10% or even 20% or even 30% of the fluid volume. With such large amounts, the accumulated volume may form a ring of particles 72, as illustrated at Position 1. When the piston moves to certain positions, the accumulated particles 72 can suddenly enter in the grooves 48.

When the piston 28 moves from Position 1 to Position 2 (the other end of the stroke) via the displacement D1, the particles 72 accumulated below the piston 28 can then move into the groove 48a as illustrated. Then, when the piston 28 reaches the Position 3 after the backwards displacement D2, the particles 72 in the groove 48a can jump into the piston groove 54 is illustrated at Position 3. The piston 28 then moves forward in its next displacement D3 and this allows the particles of the groove 54 to jump into the groove 48b as illustrated in Position 4. The piston 28 then makes another displacement D4 and returns to its retracted position. This allows the particles 72 to jump from groove 48b into the fluid outside the piston 28 as illustrated by arrows 74 upon return of piston 28 to Position 1. With this groove configuration, particles 72 may pass form the internal side of the piston 28 (where the pressure 30 is applied) to the external fluid volume 76 after the piston makes two complete strokes.

The groove should be able to accommodate the largest particles 72 accumulated below piston 28 is illustrated at Position 1. The size of these particles is defined by the filter through which the fluid passes before reaching the piston 28.

The characteristic dimensions of the grooves 48, 54 should be larger than the filter size. For example, if the filter mesh allows the passage of particles of 250 microns, the characteristic dimensions of groups 48, 54 should be larger than 250 microns. For example, the groove dimensions, e.g. height (E) and depth (D) may be 500 Microns. The approximate volume of that groove would be:

$$Vgr = D \times E \times \text{Circumference}$$
$$= 0.12 \times 500 \ 10^{-6} \times 500 \ 10^{-6}$$
$$= 3 \ 10^{-9} m^3$$

If, for example, the piston makes 120 stroke per minutes (2 strokes per second), the maximum corresponding rate of particles would be $6 \ 10^{-9} \ m^3/s$ In relation with the leak rate defined above ($Q=1.6 \ 10^{-18} \ m^3/s$), the concentration of particles could be up to:

$$(6 \ 10^{-9} \ m^3/s)/(1.6 \ 10^{-18} \ m^3/s) \sim 3 \ 10^9$$

However, this is not possible as the maximum concentration can be 1. Accordingly, this demonstrates that the groove volume is quite sufficient to allow the transfer of accumulated particles on the pressure side of the piston. Very small grooves in this example are quite sufficient to insure the particle transfer rate; however the grove should allow the largest particles to enter inside the groove.

Referring again to the examples illustrated in FIGS. 2 and 3, the passage cross grooves 48 and the piston cross grooves 54 may be oriented circumferentially along a generally flat plane. Thus, as the piston 28 translates along piston passage 42, there is full edge contact, i.e. 360° contact, between the edges of passage cross grooves 48 and those of piston cross grooves 54. As a result, the particulates are sometimes sliced and moved into the grooves 48, 54 rather than being simply moved into the grooves. In some applications, the passage cross grooves 48 and/or the piston cross grooves 54 may be provided with a curved, e.g. undulating, edge so that a small number of point contacts occur during movement of piston 28 and during the resulting interaction between the edges of grooves 48 and 54. In some applications, one of the passage cross grooves 48 or piston cross grooves 54 is provided with a curved edge while the other remains generally flat or in another dissimilar configuration. The curve tends to drive obstructions, e.g. particulates, laterally and this movement is helpful in deflecting the particles into the grooves rather than ingesting the particulates in the material of piston 28 and/or stator 44. In the event of piston jamming, the effort available to drive the piston 28 is concentrated and the crushing/cutting affect is amplified on the particulates 72 trapped in the interface/clearance 66.

Figure 4:
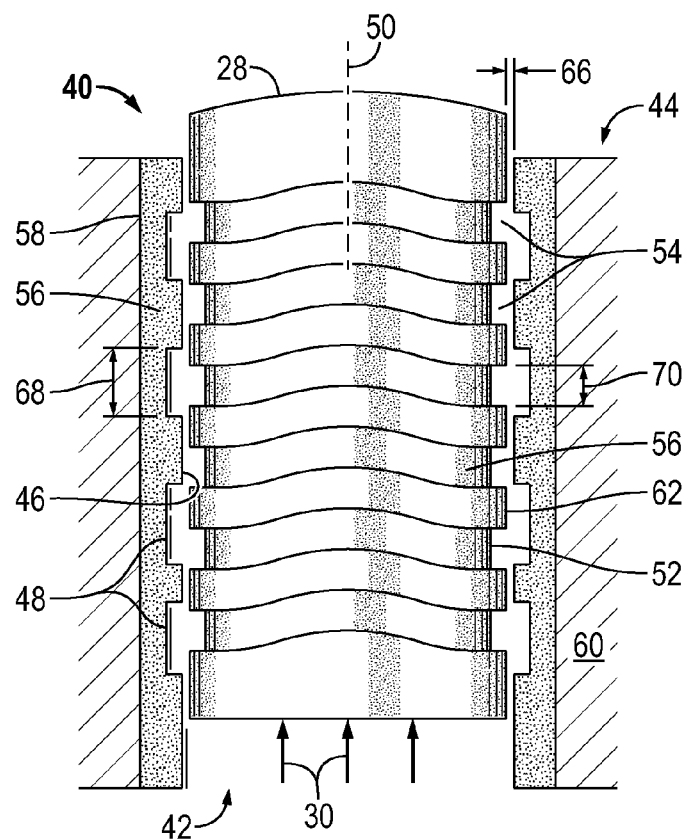
FIG. 4 is a cross-sectional view of another example of a piston type actuator, according to an embodiment of the disclosure.

An example of grooves having a curved configuration is illustrated in the embodiment of FIG. 4. In this embodiment, the piston cross grooves 54 are curved in an undulating manner as they encircle piston 28. The passage cross grooves 48, on the other hand, are generally planar and provide generally straight edged grooves. However, this arrangement of undulating grooves 54 and straight grooves 48 can be reversed. Additionally, both the piston cross grooves 54 and the passage cross grooves 48 can be curved with, for example, mismatching curved configurations.

Figure 5:
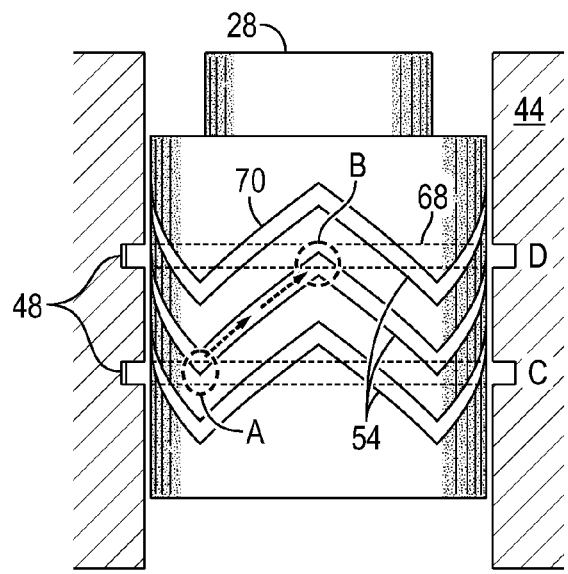
FIG. 5 is a cross-sectional view of another example of a piston type actuator, according to an embodiment of the disclosure.

Referring generally to FIG. 5, another embodiment of actuator 40 and grooves 48, 54 is illustrated. In this embodiment, at least one set of the grooves 48, 54 is arranged in a zig-zag or sawtooth configuration. The sawtooth configuration may be arranged so that the piston cross grooves 54 have a sawtooth or wave form which creates successive annular chambers in the passage cross grooves 48 of stator 44 that interact directly at the peaks and valleys of the piston cross grooves 54.

Because of the timing effect of the different groove pitches 68, 70, the grooves 48, 54 may be positioned, as illustrated, to enable a short pulse of concentrated leakage at certain groove communication points. This concentrated leakage drives particles up and out of the interface/running clearance region 66. In the example illustrated, the flow path between passage cross grooves 48 (labeled C and D) is normally across the edges of the groove and through a restricted flow gap.

However, when the piston cross grooves 54 line up such that the points labeled A and B are engaging the passage cross grooves 48 labeled C and D, respectively, then there is a preferential flow path directly between C and D for a brief moment of piston travel. The pressure in the passage cross groove 48 labeled C drives fluid and particles up to the passage cross groove 48 labeled D. This pattern is repeated as piston 28 is moved along piston passage 42 so as to continually encourage the removal of particulates from the interface/running clearance region 66.

Figure 6:
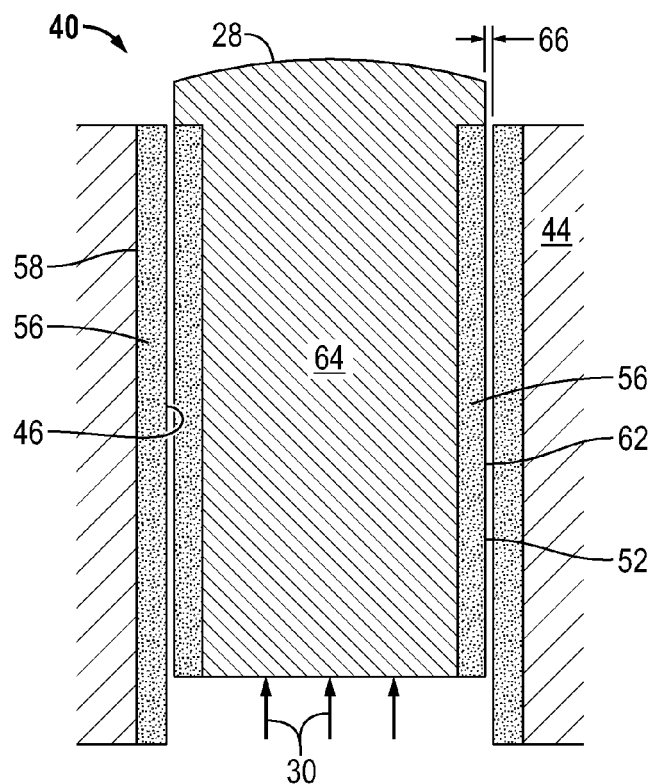
FIG. 6 is a cross-sectional view of another example of a piston type actuator, according to an embodiment of the disclosure.

In some applications, sufficient protection against particulates may be provided simply by forming passage wall surface 46 and piston exterior surface 52 with hardened material 56 so as to provide hard contact surfaces, as illustrated in the embodiment of FIG. 6. The piston 28 and stator 44 may be formed of the hard material 56, or sleeves 58, 62 of the hardened material may be mounted in the stator 44 and on the piston 28, respectively. In some applications, the hardened material 56 may be applied as a coating, e.g. applied as a coating through a high velocity oxygen fuel (HVOF) procedure. In this example, the piston 28 and stator 44 are protected by the hard material instead of placing grooves along the piston 28 and/or stator 44. Sometimes, the embodiment of FIG. 6 may be improved for certain applications. For example, sometimes the surfaces 46 and 52 may have rough surface where the roughness results primarily from discontinuous circumferential scratches. These circumferential scratches act as grooves previously described in FIGS. 2 and 3. If sufficiently sized, the scratches are able to accommodate particles (as would the grooves illustrated in FIGS. 2 and 3). This embodiment is fully applicable for small particles or particles which may be shaved (sheared) in small enough elements.

The embodiments described above enable maintenance of tight tolerances between the piston 28 and surrounding stator 44. In a variety of applications, tight tolerances along interface/clearance region 66 may be used to prevent excessive leakage. This was explained above by formula (a). Otherwise, excessive leakage (or the creation of excessive leakage through erosion of components) can have deleterious effects by reducing performance and/or by encouraging increased component wear.

Figure 7:
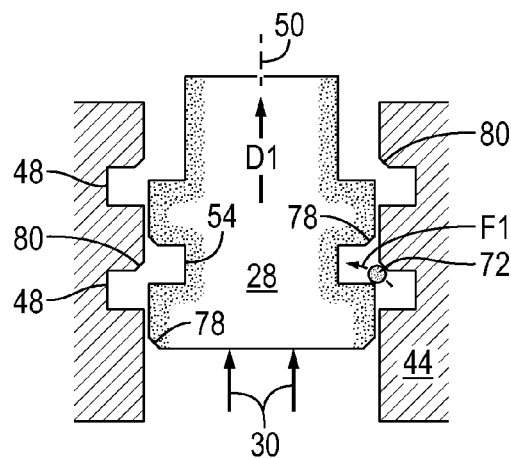
FIG. 7 is a schematic cross-sectional view of a piston assembly having a groove with a shape to limit particle jamming between the piston and the surrounding wall of the piston passage, according to an embodiment of the disclosure.
Figure 8:
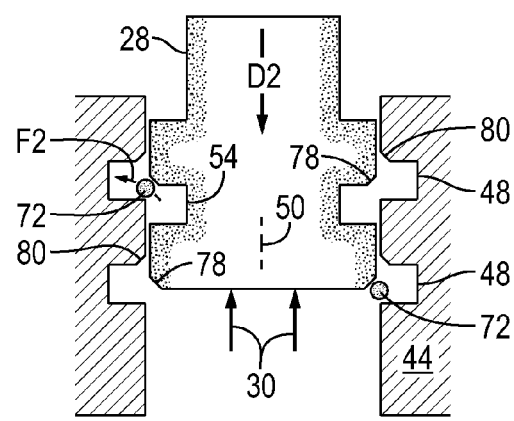
FIG. 8 is a schematic cross-sectional view of a piston assembly similar to that of FIG. 7 but with the piston in a different operational position, according to an embodiment of the disclosure.

As explained above, there are situations where particles may be "sheared" at the edge of the groove 48 of the piston passage and the edge of the groove 54 of the piston 28. To limit the occurrence of this shearing of particles, the groove may have chamfers (78 and 80) as shown in FIGS. 7 and 8. With respect to movement of piston 28, the difference of pressure 30 pushes the particles via the chamfer When the piston 28 is making the displacement D1, for example, the particles 72 stuck at chamfer 80 are then subjected to a force F1. Force F1 pushes those particles 72 into the next groove which is the groove 54 of the piston 28 (see FIG. 7). When the piston 28 is making the displacement D2, the particles 72 stuck at chamfer 78 are then subjected to a force F2. Force F2 pushes those particles 72 into the next groove which is the groove 48 of the stator 44 containing the piston passage (see FIG. 8).

Figure 9:
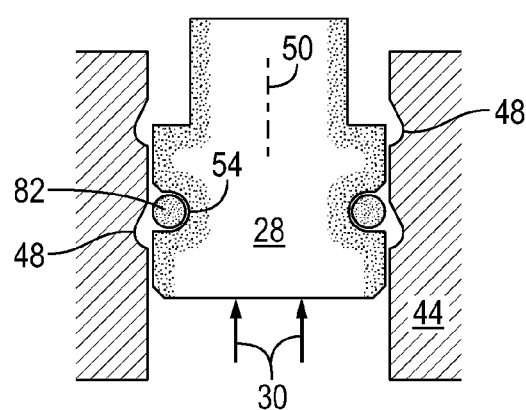
FIG. 9 is a schematic cross-sectional view of a piston assembly having a groove equipped with mobile element to facilitate cleaning of the grooves, according to an embodiment of the disclosure.
Figure 10:
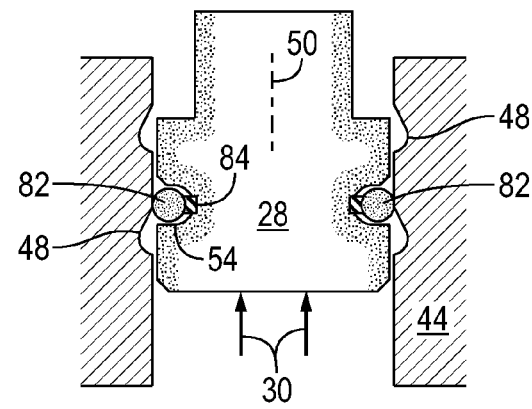
FIG. 10 is a schematic cross-sectional view of a piston assembly having a groove equipped with mobile element and a deformable feature to facilitate cleaning of the grooves, according to an embodiment of the disclosure.

The grooves 48, 54 also may be equipped with mobile or deformable features to insure the cleaning of the groove, as illustrated in the "ball-cleaning" embodiment of FIGS. 9 and 10. In the "ball-cleaning" system, the piston groove 54 is rounded and mobile elements 82, e.g. balls, are installed in that groove 54. The balls 82 adequately match the groove 54. The grooves 48 of the stator 44 are rounded and shallower than the piston grooves 54. When the piston 28 moves and undergoes vibration, the balls 82 shake accumulated particles into the piston grooves 54 so that the accumulated particles do not stick to the piston 28. This process helps the progressive movement of the particles 72 into the next groove 48 of the stator 44.

When the groove 54 is aligned with groove 48, the balls or other mobile elements 82 can partially enter in the groove 48 to shake the accumulation of particles and to facilitate their transport into the next groove. When the grooves become misaligned, the balls 82 are pushed back into the groove 54 of the piston 28 due to the rounded shallow pattern of the groove 48. An additional cleaning effect can be obtained by employing a deformable ring 84 installed at the bottom of the groove 54, as illustrated in FIG. 10. In this embodiment, the balls 82 are pushed radially by the deformable ring 84 against the bore of the stator 44. This pushing helps the cleaning effect of the balls 82 in the groove 48 of the stator 44. By way of example, the deformable ring 84 may be made of rubber. Other mobile and deformable items also can be installed in the groove(s) 54 of the piston 28. In some applications, the mobile and deformable items can be installed in groove 48 of the stator 44. In these applications, the balls or mobile elements may be solid polycrystalline diamond, silicon bonded diamond, tungsten carbide, ceramic or stellite. The balls or mobile elements 82 also can be made of metal coated with hard layer such by an HVFO process. In some embodiments, the balls or mobile elements 82 may have deformable elements 84 which can be installed in the groove 48 of the stator 44. A cleaning effect analogous to that explained above is similarly provided.

As explained above, the working clearance is selected so as to have enough length (shown as 71a+71b in FIG. 3). The stroke of the piston 28 may be set forth as follows:

$$n \times (71b + E)$$

With:

n being the number of grooves in the piston 28; and 71b and E being as shown in FIG. 3.

In this example, 71b is long enough to limit the leak-rate in the working clearance. The length 71b may be a few millimeters to even 10 mm or even 15 mm Dimension E is large enough to easily accommodate the largest particles 72 reaching the side of piston 28 experiencing pressure 30. Dimension E may be between 100 Microns and 250 Microns, or even between 250 and 500 microns, or even up to 2 mm.

Figure 11:
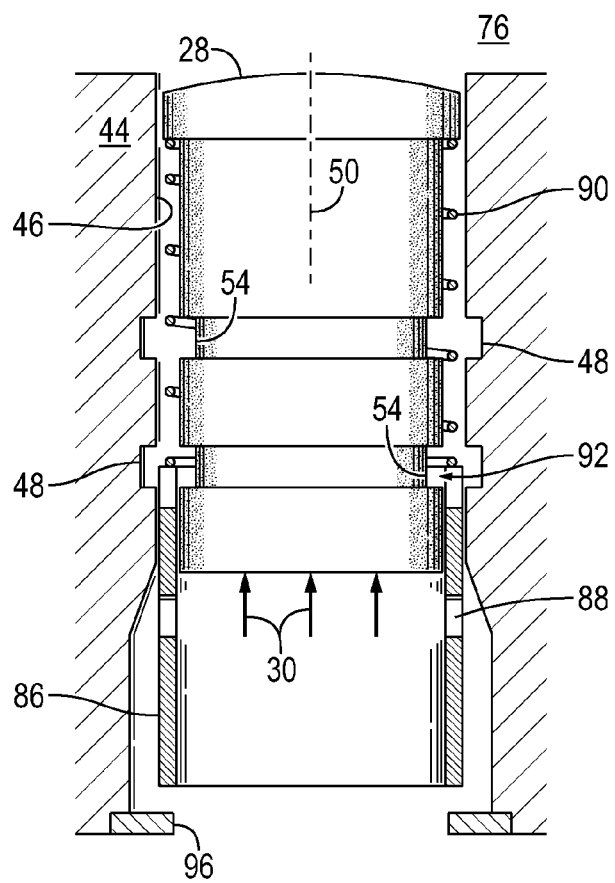
FIG. 11 is a schematic cross-sectional view of a piston assembly having a mobile sleeve enhancing long-term piston performance with a short stroke, according to an embodiment of the disclosure.

With E=500 microns and 71b=5 mm, for example, the piston stroke may be 5.5 mm to ensure proper particles transfer as explained with reference to FIG. 3. In some applications, the piston displacement may be small or variable between strokes. This is the case for an actuating piston of a rotary steerable system. The stroke may be very small in some cases. In such cases, for example, an additional sleeve 86 may be added, as illustrated in FIGS. 11 and 12.

The sleeve 86 slides between the stator 44 and the piston 28. This sleeve 86 has openings 88 which act with the grooves 48 and 54 to allow accumulation and transport of particles 72 via the sleeve displacement. As illustrated, the sleeve 86 may be pushed backwards towards the pressure 30 side by a spring 90. On the discharge side of the leak, the sleeve 86 ends at a slot 92 defined in length by a dog 94. A mechanical stop 96 limits the backwards displacement of the sleeve 86.

Figure 14:
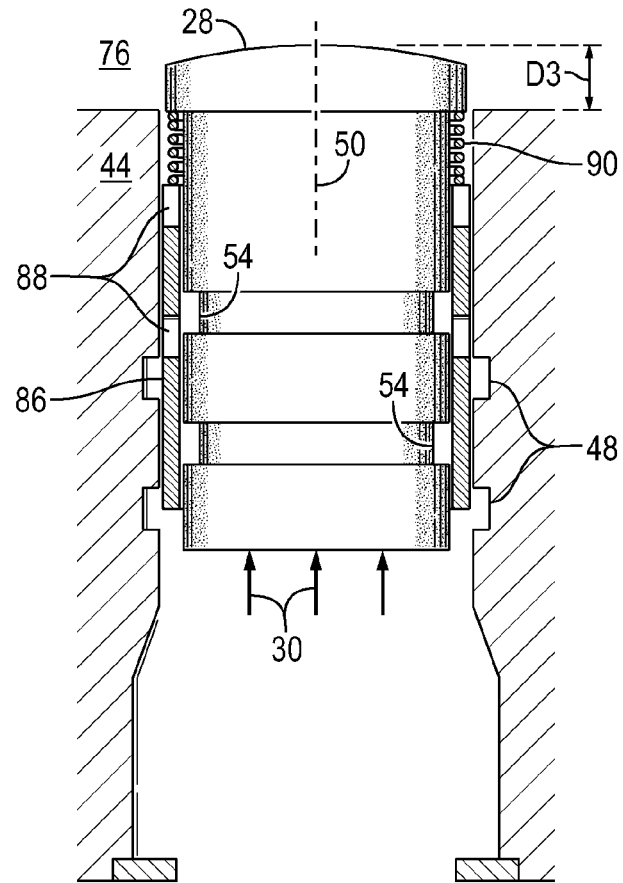
FIG. 14 is a schematic cross-sectional view similar to that of FIG. 13 but with the piston and piston sleeve in a different operational position, according to an embodiment of the disclosure.

Referring generally to FIGS. 13 and 14, the position of the piston 28 and the sleeve 86 is illustrated at two extreme positions (retracted and extended). As illustrated, the displacement D4 of the sleeve 86 represents the distance of sleeve movement between the two extreme positions. Movement D4 is substantially larger than the displacement D3 of piston 28. Due to grooves/openings 88 of the sleeve 86, particles 72 can perform the progressive movement from the inner chamber, where the pressure 30 may be present, to the outside space 76.

Figure 15:
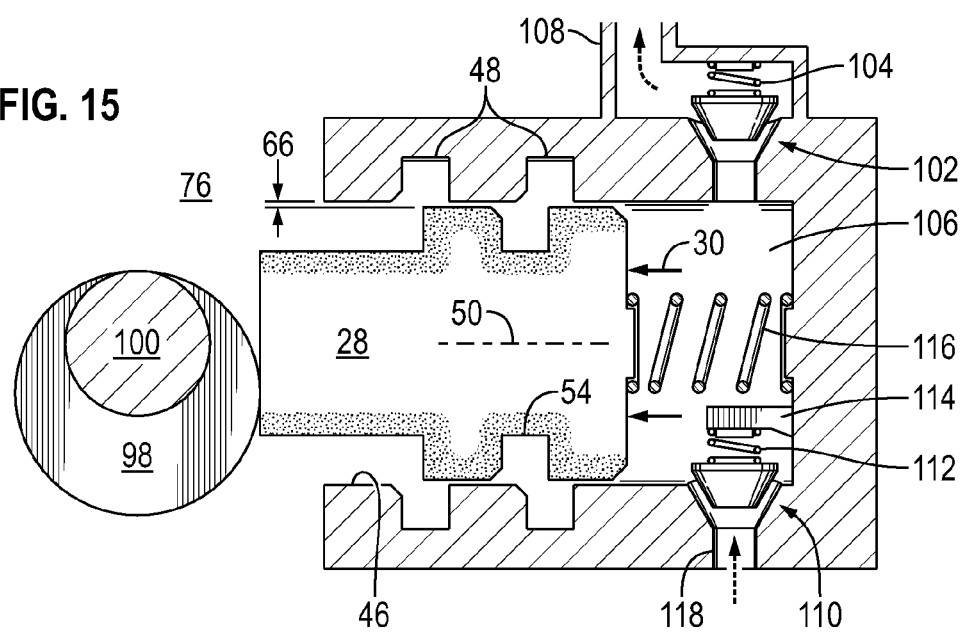
FIG. 15 is a schematic cross-sectional view of another embodiment of a piston assembly employed as a pump, according to an embodiment of the disclosure.

Another example is illustrated in FIG. 15 in which the piston 28 may be an element of a positive displacement pump. The piston 28 can be pushed by a cam 98 attached to a rotary shaft 100. During the forward movement (pushed by the cam 98), a discharge valve 102 opens by compressing a spring 104 and fluid in a pump chamber 106 is transferred into a discharge line 108. During that phase, a suction valve 110 is closed due to a spring 112. This spring 112 is compressed by a spring support 114. During the backwards movement, the piston 28 undergoes a backwards movement which may be induced by a spring 116. During this phase, the discharge valve 102 closes due to the spring 104, while the suction valve 110 opens to let fluid from a suction chamber 118 enter into the pump chamber 106. During these movements (especially the forward discharge phase), the differential pressure 30 has a tendency to push fluid and particles into the working clearance 66. The piston 28 may be equipped with groove 54 and the piston passage/stator 44 may be equipped with grooves 48 to help the evacuation of particles from the working clearance in the same way as for the case of an actuating piston.

Depending on the application, system 20 may have a variety of configurations comprising other and/or additional components. For example, the shape and structure of drilling system components, steering components, and/or other components of the overall system 20 may vary in size and configuration depending on the parameters of a given application and environment. Additionally, many types of pistons 28 and corresponding stators 44 may be used depending on the application carried out by the overall system. The actuator pistons may be used in many types of drill strings, other types of well strings, and other tools actuated by fluid carrying particulates or susceptible to particulates. The actuator pistons may be used to provide steering inputs, to open or close valves and other devices, and/or for a variety of other applications. Additionally, the actuator pistons may be used in a variety of non-well applications.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A system for facilitating piston action in a fluid having particulates, comprising:

a stator having a piston passage oriented along a linear axis, the piston passage being defined by a passage surface having a plurality of passage cross grooves; and a piston slidably received in the piston passage for movement along the linear axis, the piston comprising an exterior surface having a plurality of piston cross grooves, the piston cross grooves and the passage cross grooves remaining open for collection of particulates, the piston cross grooves and the passage cross grooves sliding past each other during movement of the piston along the linear axis.

2. The system as recited in claim 1, wherein the piston passage is cylindrical and the passage cross grooves extend along the circumference of the piston passage.

3. The system as recited in claim 2, wherein the piston cross grooves extend around the circumference of the piston.

4. The system as recited in claim 3, wherein the piston cross grooves are undulating grooves.

5. The system as recited in claim 3, wherein the piston cross grooves are sawtooth grooves.

6. The system as recited in claim 3, wherein at least one of the piston cross grooves is arranged to simultaneously intersect at least two of the passage cross grooves as the piston travels linearly along the linear axis.

7. The system as recited in claim 1, wherein the piston cross grooves are formed in a hardened material.

8. The system as recited in claim 1, wherein mobile elements are placed in at least one of the piston cross grooves or the passage cross grooves to help move the particulates between piston cross grooves and passage cross grooves.

9. The system as recited in claim 1, wherein the piston works in cooperation with a mobile sleeve equipped with openings.

10. The system as recited in claim 1, wherein the piston operates as a pump.

11. The system as recited in claim 1, wherein the passage cross grooves are formed in a hardened material.

12. The system as recited in claim 1, wherein the stator and the piston are mounted in a well tool, the piston being actuated by a downhole well fluid.

13. A system for facilitating piston action in a fluid having particulates, comprising:

a stator having a piston passage oriented along a linear axis, the piston passage being defined by a passage surface having a plurality of passage cross grooves sized to enable entry of particulates carried by the fluid; and a piston slidably received in the piston passage for movement along the linear axis, the piston comprising an exterior surface having a plurality of piston cross grooves sized to enable entry of particulates carried by the fluid, the piston cross grooves and the passage cross grooves sliding past each other during movement of the piston along the linear axis, at least one of the piston cross grooves and the passage cross grooves being formed in a hardened material.

14. The system as recited in claim 13, wherein the hardened material is formed as a sleeve.

15. The system as recited in claim 13, wherein the hardened material comprises at least one of polycrystalline diamond, silicon bonded diamond, tungsten carbide, ceramic, or stellite.

16. A method for actuating, comprising:

slidably mounting an actuator piston in a piston passage defined by a passage wall surface;

moving the actuator piston linearly along the piston passage with an actuating fluid; and collecting particulates from the actuating fluid in a plurality of grooves located along the passage wall surface.

17. The method as recited in claim 16, further comprising locating the plurality of grooves on an exterior surface of the actuator piston.

18. The method as recited in claim 16, further comprising locating the plurality of grooves within the passage wall surface.

19. The method as recited in claim 16, further comprising locating the plurality of grooves on both an exterior surface of the actuator piston and the passage wall surface.

20. The method as recited in claim 16, further comprising mounting the actuator piston in a well tool.

* * * * *